US008792477B2

(12) United States Patent
Gong (10) Patent No.: US 8,792,477 B2
(45) Date of Patent: Jul. 29, 2014

(54) METHOD AND APPARATUS FOR IDENTIFYING VOIP TRAFFIC

(75) Inventor: Yuliang Gong, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 135 days.

(21) Appl. No.: 13/509,227

(22) PCT Filed: Sep. 3, 2010

(86) PCT No.: PCT/CN2010/076624
§ 371 (c)(1),
(2), (4) Date: May 10, 2012

(87) PCT Pub. No.: WO2011/060661
PCT Pub. Date: May 26, 2011

(65) Prior Publication Data
US 2012/0230324 A1    Sep. 13, 2012

(30) Foreign Application Priority Data

Nov. 18, 2009   (CN) .......................... 2009 1 0223389

(51) Int. Cl.
*H04L 12/66* (2006.01)
*H04L 29/06* (2006.01)
(52) U.S. Cl.
CPC ................................. *H04L 65/1043* (2013.01)
USPC ........... 370/352; 370/252; 370/329; 709/226; 709/228
(58) Field of Classification Search
USPC .......... 370/352, 401, 252, 328–329; 709/228, 709/226
See application file for complete search history.

(56) References Cited

U.S. PATENT DOCUMENTS 7,245,609 B2 *   7/2007  D'Eletto .................... 370/352
8,560,693 B1 *  10/2013  Wang et al. ................. 709/226

(Continued)

FOREIGN PATENT DOCUMENTS

| CN | 1838663 A    | 9/2006 |
| CN | 1913456 A    | 2/2007 |
| CN | 1913498 A    | 2/2007 |
| WO | 03/024034 A1 | 3/2003 |

OTHER PUBLICATIONS

International Search Report for PCT/CN2010/076624.

(Continued)

*Primary Examiner* — Chareles C Jiang
*Assistant Examiner* — Mohamed Kamara
(74) *Attorney, Agent, or Firm* — McClure, Qualey & Rodack, LLP (57) ABSTRACT

The present invention discloses a method for identifying Voice over Internet Protocol (VoIP) traffic. Based on a Media Gateway Control Protocol (MGCP), the method includes: identifying a packet related to a control connection by matching keywords according to an identification rule of the MGCP; extracting media connection negotiation information for establishing a media connection from the packet related to the control connection; matching the media connection negotiation information according to a transaction Identification (ID) in the media connection negotiation information; and identifying MGCP based VoIP traffic according to matching results. The present invention further discloses an apparatus for identifying VoIP traffic based on the MGCP. In the condition of using the MGCP and performing a plurality of media connection negotiations on one control connection simultaneously, the present invention can identify the MGCP based VoIP traffic without any particular requirement on the deployed positions of deep packet inspection devices.

11 Claims, 5 Drawing Sheets

(56) References Cited

U.S. PATENT DOCUMENTS

2006/0077963 A1* 4/2006 Li et al. .................... 370/352
2006/0077989 A1* 4/2006 Lu et al. .................... 370/401
2006/0262789 A1 11/2006 Peleg et al.
2007/0206582 A1 9/2007 Kuncoro et al.
2008/0137598 A1* 6/2008 Bouvier et al. ............. 370/329
2009/0097477 A1* 4/2009 Zhu ........................... 370/352
2009/0198821 A1* 8/2009 Lin ............................ 709/228

OTHER PUBLICATIONS

Andreasen, et al.: "Media Gateway Control Protocol (MGCP)"; Version 1.0, Jan. 2003, pp. 1-211.

* cited by examiner

METHOD AND APPARATUS FOR IDENTIFYING VOIP TRAFFIC

CROSS REFERENCE RELATED APPLICATIONS

This application is a national phase of PCT/CN2010/076624 filed Sep. 3, 2010, which claims priority to China Application Serial No. 200910223389.5, filed Nov. 18, 2009, both of which are entirely incorporated herein by reference.

TECHNICAL FIELD

The present invention relates to the field of communications, and in particular, to a method and apparatus for identifying Voice over IP traffic.

BACKGROUND OF THE RELATED ART

With the increasing progress of the Internet technologies, the Voice over IP (VoIP) technology appears. The VoIP technology has developed rapidly since its emergence. With the rapid growth of users, the VoIP traffic also grows rapidly on the network, and therefore, how to identify a media connection through the VoIP traffic becomes a problem that needs to be solved.

At present, a method for identifying the media connection for VoIP traffic of a Session Initiation Protocol (SIP) is provided in the related art. The method comprises the following steps:

in step one, a control connection is established by communication parties, wherein, the communication parties are media gateways, i.e., the media gateways establish the media control connection in place of the users;

in step two, the media connection negotiation is performed on the SIP based control connection;

in step three, a deep packet inspection apparatus for identifying a media stream obtains negotiation results of the communication parties, and if the negotiation is successful, the media connection negotiation information of the communication parties is recorded; and in step four, the media connection of the communication parties is identified according to the media connection negotiation information of the communication parties.

During the implementation of the above process, the deep packet inspection (DPI) apparatus obtains the media connection negotiation information on the SIP based control connection, and identifies the media connection. The above method is only suitable for the condition that the SIP based control connection is used for a pair of users to perform the media negotiation. For the condition that negotiation is performed on one control connection for multiple pairs of users simultaneously through a Media Gateway Control Protocol (MGCP) between two media gateways, the above method is unable to be applied, thus being unable to identify the media connection.

SUMMARY OF THE INVENTION

The present invention provides a method and apparatus for identifying VoIP traffic, and the MGCP based VoIP traffic can be identified by the method and apparatus.

A method for identifying VoIP traffic, wherein, based on a MGCP, the method comprises:

identifying a packet related to a control connection by matching keywords according to an identification rule of the MGCP;

extracting media connection negotiation information for establishing a media connection from the packet related to the control connection;

matching the media connection negotiation information according to a transaction Identification (ID) in the media connection negotiation information; and identifying MGCP based VoIP traffic according to matching results.

The packet related to the control connection comprises a control connection packet and a media connection negotiation packet, and the identification rule of the MGCP comprises an identification rule of the control connection packet and an identification rule of the media connection negotiation packet;

the identification rule of the control connection packet is that first 4 characters in a payload area of the packet being MGCP command characters and "MGCP" keywords being after the MGCP command characters, wherein, the MGCP command characters comprise "EPCF", "RQNT", "NTFY", "CRCX", "MDCX", "DLCX", "AUEP", "AUCX" and "RSIP"; and the identification rule of the media connection negotiation packet is that a payload area of the packet comprising keywords "v=", "c=IN" and "m=", wherein "v=" represents protocol version number; currently only 0, "c=IN" represents connection information—not required if included in all media, and "m=" (if present) represents media name and transport address.

The media connection negotiation information is extracted from the media connection negotiation packet, wherein, the media connection negotiation information comprises IP addresses, port numbers and media types;

the step of extracting media connection negotiation information for establishing a media connection from the packet related to the control connection comprises:

if first 4 characters in the payload area of the media connection negotiation packet are characters, extracting the transaction ID beginning from a sixth byte of the payload area until a blank appears; and if first 3 characters in the payload area of the media connection negotiation packet are numbers, extracting a transaction ID beginning from the fifth byte of the payload area until a blank appears;

extracting an IP address of the media connection beginning from a sixth byte after the string "c=IN" until ASCII codes <CR> and <LF> symbols appear;

extracting a port number of the media connection beginning from a first blank after the string "m=" until a blank appears; and extracting a media type of the media connection beginning after the string "m=" until a blank appears.

The step of identifying the MGCP based VoIP traffic comprises:

if the media connection negotiation information is matched to the media connection negotiation information with the same transaction ID at an opposite end of the control connection, establishing a media connection according to the IP addresses, port numbers and media types in the media connection negotiation information with the same transaction ID, and adding the media connection to a pre-configured connection table.

After the step of identifying the MGCP based VoIP traffic, the method further comprises:

configuring ageing time for the established media connection; and within the ageing time of the established media connection, if there is no packet transmission on the media connection, deleting the established media connection.

The method further comprises:

if the media connection negotiation information is not matched to media connection negotiation information with the same transaction ID at an opposite end of the control connection, storing the media connection negotiation information which fails to be matched, and configuring ageing time for the media connection negotiation information which fails to be matched; and within the ageing time of the media connection negotiation information of users failing to negotiate, if the media connection negotiation information is matched to media connection negotiation information with the same transaction ID, establishing a media connection according to the IP addresses, port numbers and media types in the media connection negotiation information with the same transaction ID, and adding the media connection to a pre-configured connection table.

The media connection negotiation information which fails to be matched is stored through a dynamic memory.

An apparatus for identifying VoIP traffic, wherein, the apparatus is based on a MGCP, and the apparatus comprises:

a first identifying module, configured to identify a packet related to a control connection according to an identification rule of the MGCP, by matching keywords;

an extracting module, configured to extract media connection negotiation information for establishing a media connection from the packet related to the control connection;

a matching module, configured to match the media connection negotiation information according to a transaction Identification (ID) in the media connection negotiation information; and a second identifying module, configured to identify the MGCP based VoIP traffic according to matching results.

The extracting module is configured to extract media connection negotiation information for establishing a media connection from the packet related to the control connection in accordance with the following modes:

if first 4 characters in a payload area of the media connection negotiation packet are characters, extracting a transaction ID beginning from the sixth byte of the payload area, until a blank appears; and if first 3 characters in the payload area of the media connection negotiation packet are numbers, extracting a transaction ID beginning from the fifth byte of the payload area, until a blank appears;

extracting an IP address of the media connection beginning from the sixth byte after the string "c=IN", until ASCII codes <CR> and <LF> symbols appear;

extracting a port number of the media connection beginning from the first blank after the string "m=", until a blank appears; and extracting a media type of the media connection beginning after the string "m=", until a blank appears.

The second identifying module is configured to identify the MGCP based VoIP traffic according to the matching results in accordance with the following modes: if the media connection negotiation information is matched to media connection negotiation information with the same transaction ID at an opposite end of the control connection, establishing a media connection according to the IP addresses, port numbers and media types in the media connection negotiation information with the same transaction ID, and adding the media connection to a pre-configured connection table.

The apparatus further comprises:

a first configuration module, configured to configure ageing time for the established media connection; and a first management module, configured to delete the established media connection if there is no packet transmission on the media connection within the ageing time of the established media connection.

The apparatus further comprises:

a second configuration module, configured to store the media connection negotiation information which fails to be matched and configure ageing time of the media connection negotiation information which fails to be matched, if the media connection negotiation information is not matched to the media connection negotiation information with the same transaction ID at an opposite end of the control connection; and a second management module, configured to establish a media connection according to the IP addresses, port numbers and media types in the media connection negotiation information with the same transaction ID and add the media connection to a pre-configured connection table, if the media connection negotiation information is matched to the media connection negotiation information with the same transaction ID within the ageing time of the media connection negotiation information of users who fail to negotiate.

In the condition of using the MGCP and performing a plurality of media connection negotiations on one control connection simultaneously, the technical scheme provided by the present invention can identify the MGCP based VoIP traffic without any particular requirement on the deployed positions of deep packet inspection devices.

PREFERRED EMBODIMENTS OF THE PRESENT INVENTION

The technical scheme provided by the present invention will be further described in conjunction with accompanying drawings hereinafter.

Figure 1:
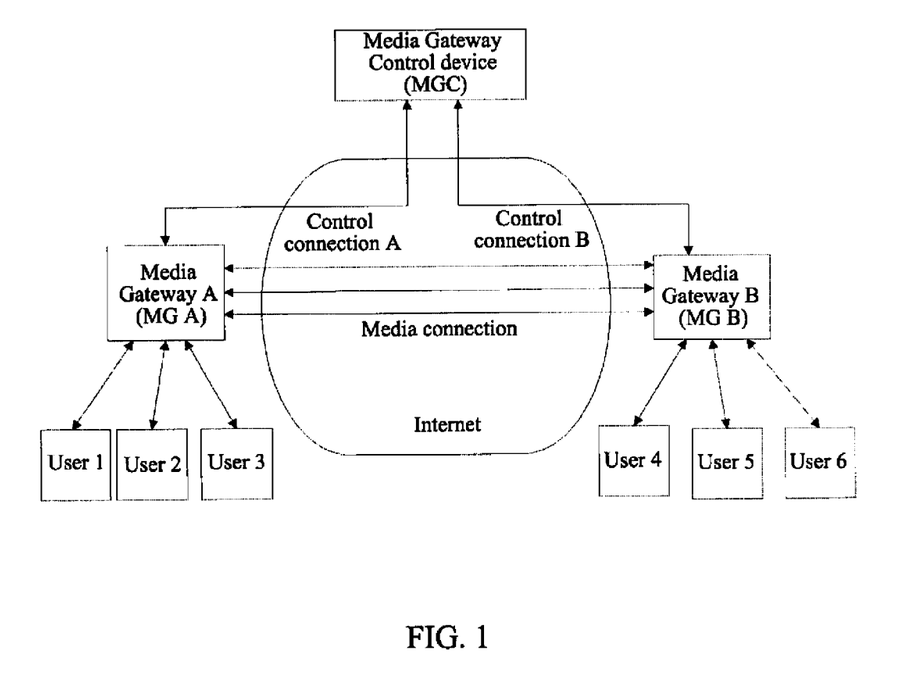
FIG. 1 is a structural diagram of a network system provided by an example of the present invention.

As shown in FIG. 1, the network system comprises two media gateways, each of which manages a plurality of users. When a user needs to establish a media connection to communicate with an opposite user, for example, user 1 needs to communicate with user 4, the media gateway establishes a control connection with a media gateway control device in the network. As shown in FIG. 1, a media gateway A establishes a control connection A with the media gateway control device, and a negotiation process of the media connection is performed on the control connection. If the negotiation is successful, a media connection is established between two media gateways for communication.

Figure 2:
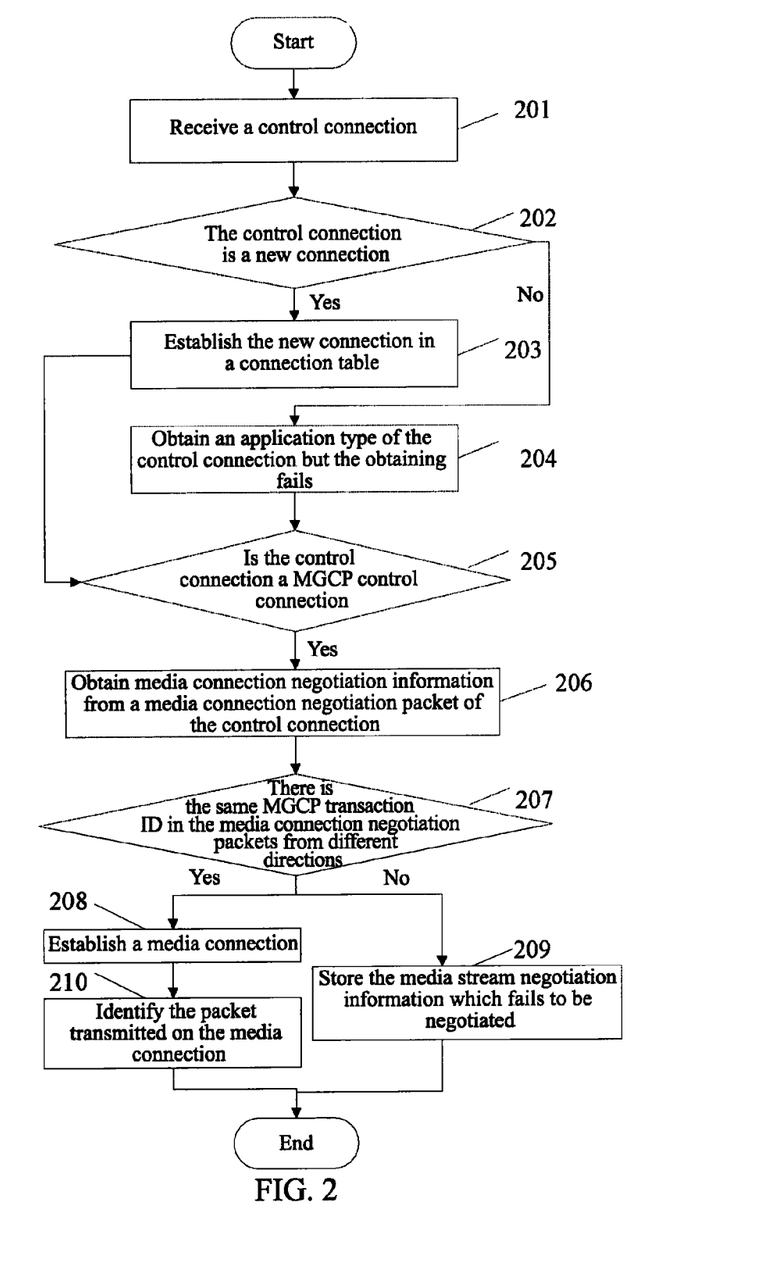
FIG. 2 is a flowchart of a method for identifying VoIP traffic based on media gateway control provided by an example of the present invention.

The method for identifying VoIP traffic based on media gateway control will be described hereinafter. As shown in FIG. 2, the method includes the following steps.

In step 201, a control connection is received.

In step 202, whether the control connection is a new connection is determined by search, and if the control connection is a new connection, perform step 203; and if the control connection is not a new connection, perform step 204.

In the present step, whether there is a record of the control connection is determined by search from a preset connection table, and if there is no record of the control connection, it is indicated that the control connection is a new connection, and perform step 203; and if there is a record of the control connection, it is indicated that the control connection is not a new connection, and perform step 204.

Wherein, the connection table is used to record the media connection negotiation information of users who successfully negotiate the media connection.

In the present invention, the connection table comprises storage entries of connection extension information, which is used to temporarily store the media connection negotiation information on the control connection.

Preferably, the following steps can be used: setting one linked table header for each entry of the connection table, and applying for a dynamic memory after obtaining the media connection negotiation information, and adding to the connection extension information linked table, wherein, the storage entries of extension information are managed using a fixed size. As a number of negotiation information on one control connection is uncertain, the use of the dynamic memory for storage can reduce the consumption of the memory resources.

In step 203, the new connection is established in the connection table.

After the performing of the step 203 is completed, perform step 205.

In step 204, the application type of the control connection is obtained, and if the obtaining fails, perform step 205.

In step 205, whether the control connection is a MGCP control connection is determined.

Specifically, whether the control connection packet on the control connection has the following features is determined: first 4 characters before the payload being MGCP command characters and MGCP strings being after the MGCP command characters, wherein, the MGCP command characters comprise EPCF, RQNT, NTFY, CRCX, MDCX, DLCX, AUEP, AUCX and RSIP.

Preferably, in the determination process, one counter can be set, and only when the feature appears on multiple control connection packets on the control connection in a period of time, the connection can be determined as a MGCP control connection, which can reduces the error hit ratio.

If the connection is a MGCP control connection, perform step 206; otherwise, the process ends.

In step 206, the media connection negotiation information is obtained from the media connection negotiation packet of the control connection.

Wherein, the media connection negotiation packet comprises sequential three strings, i.e., "V=", "c=IN" and "m=", and can be divided into a command packet and a response packet, and in which "v=" represents protocol version number, currently only 0, "c=IN" represents connection information—not required if included in all media, and "m=" (if present) represents media name and transport address.

If there is no packet with the above features on the control connection, the process ends.

Wherein, the media connection negotiation information carried in the media connection protocol packet comprises IP addresses, port numbers and media types, and the media connection negotiation information is identified through transaction.

The process of obtaining the above media connection information will be described hereinafter.

If first 4 characters in the payload area of the packet are characters, it is determined that the packet is a command packet, and a MGCP transaction ID (identification) is extracted beginning from the sixth byte of the payload until a blank appears at the first time in the payload area of the packet. If first 3 characters in the payload area are numbers, it is determined that the packet is a response packet, and the MGCP transaction ID is extracted beginning from the fifth byte of the payload until a blank appears at the first time in the payload area of the packet.

An IP address of the media connection is extracted beginning from the sixth byte after the keywords "c=IN" in the payload area of the packet, until ASCII codes <CR> and <LF> symbols appear in the payload area of the packet.

A port number of the media connection is extracted beginning from the first blank after the keywords "m=" in the payload area of the packet, until a blank appears at the first time in the payload area of the packet.

A media type of the media connection is extracted beginning from the keywords "m=" in the payload area of the packet, until a blank appears at the first time.

Wherein, the length of contents before the blank is not fixed.

After the performing of the step 206 is completed, perform step 207.

In step 207, whether there is the same MGCP transaction ID in the media connection negotiation packets from different directions is determined.

If there is the same MGCP transaction ID, it is indicated that the media connection negotiation is successful, and perform step 208; and if there is no the same MGCP transaction ID, it is indicated that the media connection negotiation fails, and perform step 209.

In step 208, a media connection is established, and perform step 210.

In the present step, a media connection is established according to the IP addresses, port numbers and media types in the media connection negotiation information, and the established media connection is added to a connection table.

For example, if the media type of the media connection is a Real-time Transport Protocol (RTP), a Realtime Transport Control Protocol (RTCP) connection is established by the IP addresses and port numbers in the media connection negotiation information; and a RTP connection is established by the IP and (port number+1) in the media connection negotiation information.

Preferably, ageing time of the established media connection is configured; for example, the record of the established media connection is added in the connection table, and a corresponding timer is configured.

In the ageing time of the media connection, if there is no packet transmission on the established media connection, the established media connection is deleted. For example, when the timer expires, whether there is a record of the packet transmission on the established media connection is viewed, and if there is no record of the packet transmission on the established media connection, it is indicated that the established media is not used, and the established media connection is deleted.

The use of the media connection resources is reasonably controlled by configuring the ageing time of the established media connection, and the availability of the media connection resources is enhanced.

In step 209, the media connection negotiation information which fails to be negotiated is stored, and the process ends.

A dynamic memory is applied for the connection table, and in the connection table, information storage entries are extended to store the media connection negotiation information of the users.

Preferably, the ageing time of the media connection negotiation information of the users who fail to negotiate is configured.

Within the ageing time of the media connection negotiation information of the users who fail to negotiate, if a new control connection is received and the negotiation in the new control connection is successful, the media connection negotiation information which is successfully to be negotiated is recorded.

The use of the storage space is reasonably controlled and the availability of the storage space is enhanced by configuring the ageing time of the media connection negotiation information of the users who fail to negotiate.

In step 210, the packet transmitted on the media connection is identified, and the process ends.

The identified results can be used to compute the packet traffic and compute the quality of a call, and so on.

In the condition of using the MGCP and performing a plurality of media connection negotiations on one control connection simultaneously, the technical scheme provided by present invention can identify the MGCP based VoIP traffic without any particular requirement on the deployed positions of deep packet inspection devices.

Figure 3:
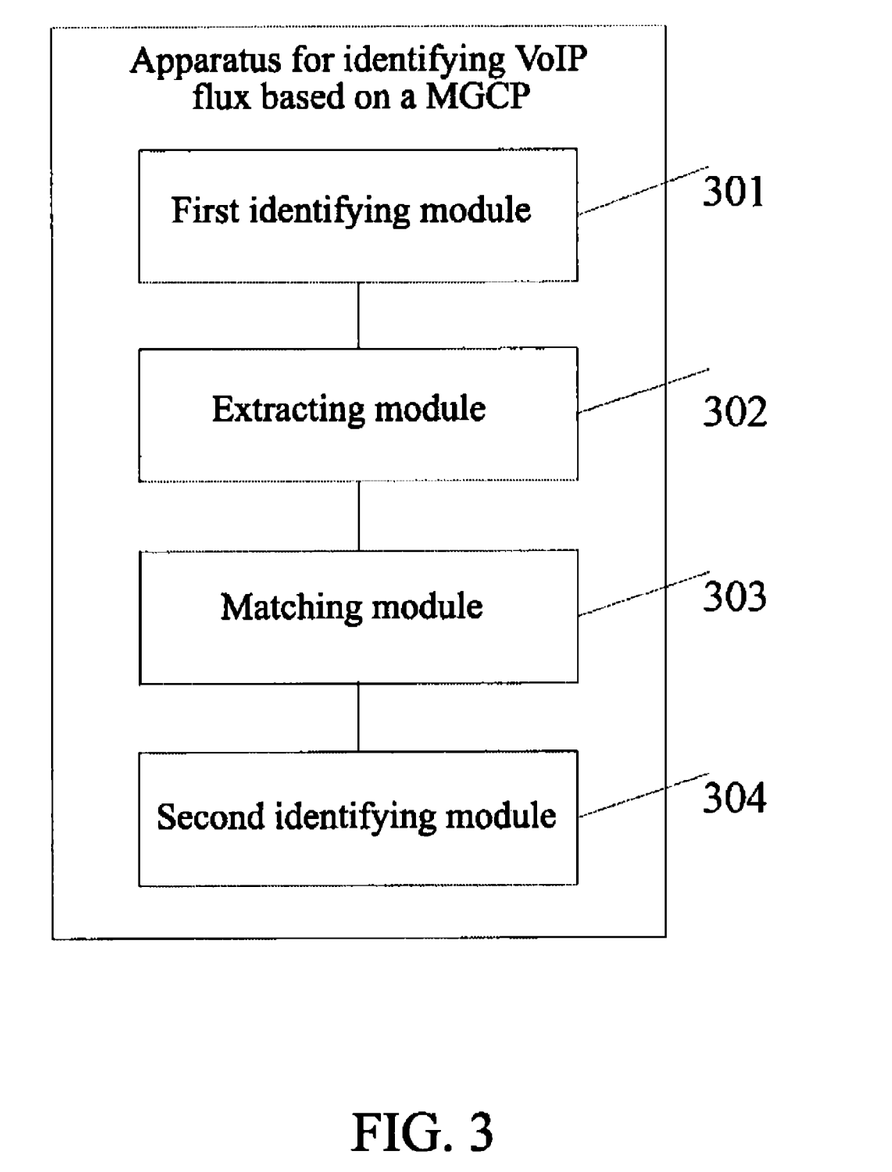
FIG. 3 is a structural diagram of an apparatus for identifying VoIP traffic based on media gateway control provided by an example of the present invention.

As shown in FIG. 3, an apparatus for identifying VoIP traffic based on media gateway control comprises:

a first identifying module 301, configured to identify a packet related to a control connection according to an identification rule of the MGCP, by matching keywords, wherein, the packet related to the control connection comprises a control connection packet and a media connection negotiation packet;

an extracting module 302, configured to extract media connection negotiation information for establishing a media connection from the packet related to the control connection;

a matching module 303, configured to match the media connection negotiation information according to a transaction ID in the media connection negotiation information; and a second identifying module 304, configured to identify the MGCP based VoIP traffic according to matching results.

Wherein, the identification rule of the MGCP comprises an identification rule of the control connection packet and an identification rule of the media connection negotiation packet.

The identification rule of the control connection packet is first 4 characters in the payload area of the packet being MGCP command characters and "MGCP" keywords being after the MGCP command characters, wherein, the MGCP command characters comprise "Endpoint Configuration (EPCF)", "Notification Request (RQNT)", "Notify (NTFY)", "Create Connection (CRCX)", "Modify Connection (MDCX)", "Delete Connection (DLCX)", "Audit Endpoints (AUEP)", "Audit Connection (AUCX)" and "Restart In Process (RSIP)"; and the identification rule of the media connection negotiation packet is that a payload area of the packet comprises keywords "v=", "c=IN" and "m=".

Wherein, the extracting module 302 is configured to extract media connection negotiation information for establishing a media connection from the packet related to the control connection in accordance with the following modes:

if first 4 characters in the payload area of the media connection negotiation packet are characters, extracting the transaction ID beginning from a sixth byte of the payload area until a blank appears; and if first 3 characters in the payload area of the media connection negotiation packet are numbers, extracting a transaction ID beginning from the fifth byte of the payload area until a blank appears;

extracting an IP address of the media connection beginning from a sixth byte after the string "c=IN" until ASCII codes <CR> and <LF> symbols appear;

extracting a port number of the media connection beginning from a first blank after the string "m=" until a blank appears; and extracting a media type of the media connection beginning after the string "m=" until a blank appears. Wherein, the second identifying module 301 is configured to identify the MGCP based VoIP traffic in accordance with the following modes:

if the media connection negotiation information is matched to the media connection negotiation information with the same transaction ID at an opposite end of the control connection, establishing a media connection according to the IP addresses, port numbers and media types in the media connection negotiation information with the same transaction ID, and adding the media connection to a pre-configured connection table.

Figure 4:
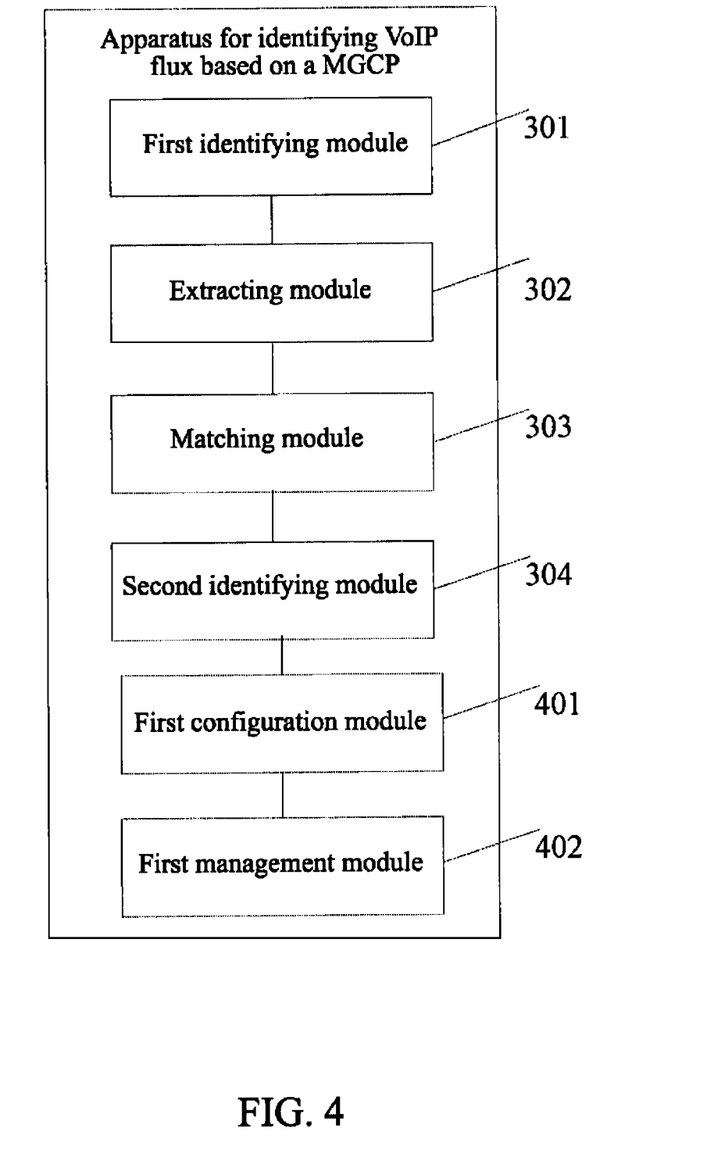
FIG. 4 is another structural diagram of the apparatus in the example illustrated in FIG. 3.

Alternatively, as shown in FIG. 4, the apparatus can further comprise:

a first configuration module 401, configured to configure ageing time for the established media connection; and a first management module 402, configured to delete the established media connection if there is no packet transmission on the media connection within the ageing time of the established media connection.

Figure 5:
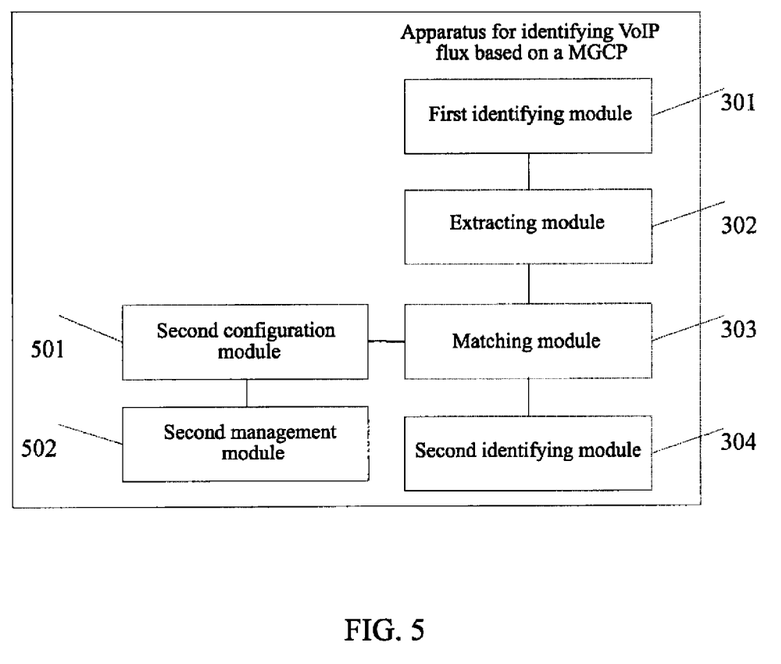
FIG. 5 is another structural diagram of the apparatus in the example illustrated in FIG. 3.

Alternatively, as shown in FIG. 5, the apparatus can further comprise:

a second configuration module 501, configured to store the media connection negotiation information which fails to be matched and configure ageing time for the media connection negotiation information which fails to be matched, if the media connection negotiation information is not matched to media connection negotiation information with the same transaction ID at an opposite end of the control connection; and a second management module 502, configured to, if the media connection negotiation information is matched to media connection negotiation information with the same transaction ID within the ageing time of the media connection negotiation information of users failing to negotiate, establish a media connection according to the IP addresses, port numbers and media types in the media connection negotiation information with the same transaction ID, and add the media connection to a pre-configured connection table.

In the condition of using the MGCP and performing a plurality of media connection negotiations on one control connection simultaneously, the technical scheme provided by present invention can identify the MGCP based VoIP traffic without any particular requirement on the deployed positions of deep packet inspection devices.

A person having ordinary skill in the art will understand that all or a part of steps for implementing the above examples can be implemented by programs instructing related hardware, which can be stored in a computer readable storage medium. The program when executed, comprises one or combination of the steps of the method examples.

In addition, various functional units in various examples of the present invention can be implemented in the form of hardware, or can also be implemented in the form of software functional module. The integrated module can also be stored in a computer readable storage media if implemented in the form of software functional module and sold or used as a separate product.

The above-mentioned storage media can be a read-only memory, a magnetic disc or an optical disc etc.

The above description is merely the specific embodiments of the present invention, and the protection scope of the present invention is not limited thereto, and in the technical scope disclosed by the present invention, any skilled person familiar with the technical field can easily think that all changes or substitutions should be contained within the protection scope of the present invention. Therefore, the protection scope of the present invention should be based on the protection scope of the claims.

INDUSTRIAL APPLICABILITY

In the condition of using the MGCP and performing a plurality of media connection negotiations on one control connection simultaneously, the technical scheme provided by present invention can identify the MGCP based VoIP traffic without any particular requirement on the deployed positions of deep packet inspection devices.

The invention claimed is:

1. A method for identifying Voice over Internet Protocol (VoIP) traffic, characterized in that the method is based on a Media Gateway Control Protocol (MGCP), and the method comprises:
    identifying a packet related to a control connection by matching keywords according to an identification rule of the MGCP;
    extracting media connection negotiation information for establishing a media connection from the packet related to the control connection;
    matching the media connection negotiation information according to a transaction Identification (ID) in the media connection negotiation information; and
    identifying MGCP based VoIP traffic according to matching results; wherein,
    the packet related to the control connection comprises a control connection packet and a media connection negotiation packet, and the identification rule of the MGCP comprises an identification rule of the control connection packet and an identification rule of the media connection negotiation packet;
    the identification rule of the control connection packet is that first 4 characters in a payload area of the packet being MGCP command characters and "MGCP" keywords being after the MGCP command characters, wherein, the MGCP command characters comprise "EPCF", "RQNT", "NTFY", "CRCX", "MDCX", "DLCX", "AUEP", "AUCX" and "RSIP"; and
    the identification rule of the media connection negotiation packet is that a payload area of the packet comprising keywords "v=", "c=IN" and "m=".

2. The method according to claim 1, wherein, the media connection negotiation information is extracted from the media connection negotiation packet, wherein, the media connection negotiation information comprises IP addresses, port numbers and media types;
    the step of extracting media connection negotiation information for establishing a media connection from the packet related to the control connection comprises:
    if first 4 characters in the payload area of the media connection negotiation packet are characters, extracting the transaction ID beginning from a sixth byte of the payload area until a blank appears; and if first 3 characters in the payload area of the media connection negotiation packet are numbers, extracting a transaction ID beginning from the fifth byte of the payload area until a blank appears;
    extracting an IP address of the media connection beginning from a sixth byte after the string "c=IN" until ASCII codes <CR> and <LF> symbols appear;
    extracting a port number of the media connection beginning from a first blank after the string "m=" until a blank appears; and
    extracting a media type of the media connection beginning after the string "m=" until a blank appears.

3. The method according to claim 2, wherein, the step of identifying the MGCP based VoIP traffic comprises:
    if the media connection negotiation information is matched to the media connection negotiation information with the same transaction ID at an opposite end of the control connection, establishing a media connection according to the IP addresses, port numbers and media types in the media connection negotiation information with the same transaction ID, and adding the media connection to a pre-configured connection table.

4. The method according to claim 3, wherein, after the step of identifying the MGCP based VoIP traffic, the method further comprises:
    configuring ageing time for the established media connection; and
    within the ageing time of the established media connection, if there is no packet transmission on the media connection, deleting established media connection.

5. The method according to claim 3, further comprising:
    if the media connection negotiation information is not matched to media connection negotiation information with the same transaction ID at an opposite end of the control connection, storing the media connection negotiation information which fails to be matched, and configuring ageing time for the media connection negotiation information which fails to be matched; and
    within the ageing time of the media connection negotiation information of users failing to negotiate, if the media connection negotiation information is matched to media connection negotiation information with the same transaction ID, establishing a media connection according to the IP addresses, port numbers and media types in the media connection negotiation information with the same transaction ID, and adding the media connection to a pre-configured connection table.

6. The method according to claim 5, wherein, the media connection negotiation information which fails to be matched is stored through a dynamic memory.

7. An apparatus for identifying Voice over Internet Protocol (VoIP) traffic, characterized in that the apparatus is based on a Media Gateway Control Protocol (MGCP), and the apparatus comprises at least one processor and a storage device, wherein the storage device stores following modules to be executed by the at least one processor:
    a first identifying module, configured to identify a packet related to a control connection by matching keywords according to an identification rule of the MGCP;

an extracting module, configured to extract media connection negotiation information for establishing a media connection from the packet related to the control connection;

a matching module, configured to match the media connection negotiation information according to a transaction Identification (ID) in the media connection negotiation information; and a second identifying module, configured to identify MGCP based VoIP traffic according to matching results; wherein, the extracting module is configured to extract media connection negotiation information for establishing a media connection from the packet related to the control connection in accordance with the following modes;

if first 4 characters in the payload area of the media connection negotiation packet are characters, extracting the transaction ID beginning from a sixth byte of the payload area until a blank appears; and if first 3 characters in the payload area of the media connection negotiation packet are numbers, extracting a transaction ID beginning from the fifth byte of the payload area until a blank appears;

extracting an IP address of the media connection beginning from a sixth byte after the string "c=IN" until ASCII codes <CR> and <LF> symbols appear;

extracting a port number of the media connection beginning from a first blank after the string "m=" until a blank appears; and extracting a media type of the media connection beginning after the string "m=" until a blank appears.

8. The apparatus according to claim 7, wherein,
the second identifying module is configured to identify the MGCP based VoIP traffic according to the matching results in accordance with the following modes: if the media connection negotiation information is matched to the media connection negotiation information with the same transaction ID at an opposite end of the control connection, establishing a media connection according to the IP addresses, port numbers and media types in the media connection negotiation information with the same transaction ID, and adding the media connection to a pre-configured connection table.

9. The apparatus according to claim 7, further comprising:
a first configuration module, configured to configure ageing time for the established media connection; and a first management module, configured to delete the established media connection if there is no packet transmission on the media connection within the ageing time of the established media connection.

10. The apparatus according to claim 7, further comprising:
a second configuration module, configured to store the media connection negotiation information which fails to be matched and configure ageing time for the media connection negotiation information which fails to be matched, if the media connection negotiation information is not matched to media connection negotiation information with the same transaction ID at an opposite end of the control connection; and a second management module, configured to, if the media connection negotiation information is matched to media connection negotiation information with the same transaction ID within the ageing time of the media connection negotiation information of users failing to negotiate, establish a media connection according to the IP addresses, port number's and media types in the media connection negotiation information with the same transaction ID, and add the media connection to a pre-configured connection tale.

11. The apparatus according to claim 8, further comprising:
a second configuration module, configured to store the media connection negotiation information which fails to be matched and configure ageing time for the media connection negotiation information which fails to be matched, if the media connection negotiation information is not matched to media connection negotiation information with the same transaction ID at an opposite end of the control connection; and a second management module, configured to, if the media connection negotiation information is matched to media connection negotiation information with the same transaction ID within the ageing time of the media connection negotiation information of users failing to negotiate, establish a media connection according to the IP addresses, port numbers and media types in the media connection negotiation information with the same transaction ID and add the media connection to a pre-configured connection table.

* * * * *